United States Patent
Mader

(10) Patent No.: US 7,635,042 B2
(45) Date of Patent: Dec. 22, 2009

(54) DEVICE FOR DETECTING COLLISION WITH A VEHICLE

(75) Inventor: Gerhard Mader, Thalmassing (DE)

(73) Assignee: Siemens Aktiengesellschaft, Munich (DE)

( * ) Notice: Subject to any disclaimer, the term of this patent is extended or adjusted under 35 U.S.C. 154(b) by 236 days.

(21) Appl. No.: 11/547,740

(22) PCT Filed: Apr. 7, 2005

(86) PCT No.: PCT/EP2005/051543

§ 371 (c)(1),
(2), (4) Date: Oct. 6, 2006

(87) PCT Pub. No.: WO2005/098384

PCT Pub. Date: Oct. 20, 2005

(65) Prior Publication Data

US 2007/0181359 A1  Aug. 9, 2007

(30) Foreign Application Priority Data

Apr. 7, 2004  (DE) .................. 10 2004 017 270

(51) Int. Cl.
*B60K 28/10* (2006.01)
(52) U.S. Cl. .................................................. 180/274
(58) Field of Classification Search .............. 280/734, 280/735; 180/271, 274; 701/45, 47
See application file for complete search history.

(56) References Cited

U.S. PATENT DOCUMENTS

| 2005/0242553 A1* | 11/2005 | Song et al. ............... 280/735 |
| 2006/0219461 A1* | 10/2006 | Kiribayashi ............ 180/274 |
| 2007/0227797 A1* | 10/2007 | Takahashi et al. ....... 180/274 |

FOREIGN PATENT DOCUMENTS

| DE | 84 33 405.3 U1 | 5/1985 |
| DE | 197 18 803 C1 | 10/1998 |
| DE | 100 62 427 A1 | 7/2002 |
| DE | 101 14 465 A1 | 9/2002 |
| DE | 101 37 250 A1 | 2/2003 |
| EP | 1 281 582 A2 | 2/2003 |
| EP | 1 350 683 A2 | 10/2003 |
| GB | 2 374 186 B | 10/2004 |
| WO | WO 03/082639 A1 | 10/2003 |

* cited by examiner

*Primary Examiner*—Faye M. Fleming
(74) *Attorney, Agent, or Firm*—Laurence A. Greenberg; Werner H. Stemer; Ralph E. Locher

(57) ABSTRACT

A device for detecting a collision with a vehicle includes a pressure sensor for detecting compression of a substantially closed measuring volume upon collision. The measuring volume is arranged along a part of the vehicle body that is impacted during the collision. The cross-sectional area of the measuring volume, along its longitudinal direction, has a comparatively larger area in the vicinity of those parts of the vehicle body that are comparatively rigid and therefore comparatively difficult to deform during collision.

9 Claims, 4 Drawing Sheets

DEVICE FOR DETECTING COLLISION WITH A VEHICLE

BACKGROUND OF THE INVENTION

Field of the Invention

The invention relates to a device for detecting collision with a vehicle, comprising a pressure sensor for detecting the compression of a substantially closed measuring volume on collision, the measuring volume being arranged along a part of the vehicle body, integrated in the bumper or behind the bumper for example, affected by the collision.

A device of this type is known from document WO 03/82639 A1. From this document it is known to arrange, behind a part of the exterior paneling of a vehicle used as a bumper (56 in FIG. 6), in a cavity (57, 58) pressure sensors (59) which can detect a colliding object, a pedestrian for example, by the increase in pressure resulting on compression of the cavity (57, 58) and can announce this to an evaluation unit in the form of a signal. Alternatively the same document proposes using acceleration sensors, deformation sensors or force sensors, which are also provided in the front region in the vicinity of the exterior paneling of the vehicle (page, 1 paragraph 3), and can detect the colliding object by the vehicle acceleration or deformation of the vehicle generated in the process. A pedestrian protection device for example is to be triggered as a function of the detected signal. The trailing part of the hood of the motor vehicle for example can be raised, so the spacing between the hood and the engine located underneath is increased and so the collision of the pedestrian's head with the hood is more gentle.

A sensing device of this type can of course also provide an early indication of an impending severe collision to the evaluation unit of an occupant protection system which, for example, then influences the trigger thresholds of an acceleration sensor that detects the vehicle collision such that an occupant protection means, for example an airbag or the like, is triggered earlier.

When using a sensing device of this type within a pedestrian protection system or as an early detection system for a severe collision within an occupant protection system, more rigid sections of the vehicle body along the front of the collision site can lead for example to the pressure sensors used, behind the bumper, passing different signal amplitudes that are dependent on the site of the collision to the pedestrian protection system or the occupant protection system. Such body reinforcements can be brought about by the shape of the bumper itself, for example by very curved parts of the exterior paneling. However, they may also exist owing to other structural conditions of the front of the vehicle, for example owing to trims or due to the provision of a number plate, a tow hook or other ancillary equipment.

SUMMARY OF THE INVENTION

The object of the present invention is to provide a device for detecting collision with a vehicle which during a collision of the same object at the same speed passes substantially consistently high signal amplitudes to a pedestrian protection system or to an occupant restraining system irrespective of the site of the collision with the vehicle body, for example the front or rear bumper.

The object is achieved by an inventive device according to claim 1.

The device according to the invention for detecting collision with a vehicle comprises a pressure sensor for detecting the compression of a substantially closed measuring volume on collision, the measuring volume being arranged along a part of the vehicle body affected by the collision, for example in the part of the exterior paneling used as the front or rear bumper, in the direction of the interior of the vehicle and behind the bumper. According to the invention the measuring volume has a cross-sectional area, along its longitudinal direction, which has a larger area behind those locations of the vehicle body at which the body is comparatively rigid and consequently difficult to deform during a collision.

Since at such regions with larger cross-sectional areas the associated measuring volume is also comparatively larger, penetration of the colliding object is made more difficult at these locations owing to the more rigid vehicle body, but, at the same time, a comparatively larger part of the measuring volume is compressed. The greater compressed volume, based on the overall measuring volume, generates a relative increase in pressure that is approximately proportional thereto, based on the normal pressure in the measuring volume. As a result the relative increase in pressure is consequently also greater than in the case of collision regions with smaller measuring volume cross-sectional areas.

The measuring volume is conventionally substantially closed, in other words there is conventionally at least slight pressure compensation of the internal pressure of the measuring volume by atmospheric pressure. For this purpose the normal pressure in the measuring volume may even optionally be deliberately charged with the atmospheric pressure via pressure compensation apertures which connect the interior of the measuring volume with the atmosphere. However, this usually takes place slowly compared with an increase in pressure in the event of collisions.

Advantageous developments of the device according to the invention are recited in the subclaims.

An advantageous development of the invention is characterized for example in that the cross-sectional area of the measuring volume in the longitudinal direction has different areas such that during a collision of the same object, i.e. in particular during collision of an object with the same mass and optionally the same form, at the same collision speed with different sites along the part of the vehicle affected by the collision, a signal amplitude of the pressure sensor that is almost identical in each case will be generated.

Depending on the locations of the vehicle body, behind which the measuring volume of a pressure sensor is arranged, at which the vehicle body meets with particularly high resistance to deformations resulting from a penetrating object, an increase in the cross-sectional area of the measuring volume, and therefore an increase in the local measuring volume, may advantageously be located around the site of the collision. For example in vehicles the bumpers are often particularly mechanically reinforced on either side of the vehicle by curvatures and are consequently very rigid and inflexible. It is to precisely here that it is advantageous to arrange the largest cross-sectional areas, compared with the remaining measuring volume. If the bumper is also particularly flexible centrally between these two curved sides, it is also optionally advantageous for the measuring volume located behind to have a particularly small cross-sectional area.

By contrast, in a particularly rigid central portion of the bumper it is advantageous if the largest cross-sectional area of the measuring volume is arranged therebehind. A central reinforcement of this kind does not have to be generated by the bumper itself. As stated in the introduction, the vehicle number plate, a support therefor, streamlined additions to the external appearance of the motor vehicle, for example trims, a tow hook or the like can, by way of example, contribute to reinforcement of the vehicle body at that location.

In this sense all changes to the cross-sectional areas of the measuring volume behind a collision area of a motor vehicle that is to be detected metrologically are to be protected which are capable of generating optimally uniform signals of the pressure sensor regardless of which collision section in the vicinity of the measuring volume is affected by a vehicle collision. In this sense all expedient combinations of the subclaims in particular are to be protected.

Advantageous embodiments and developments of a device according to the invention are described hereinafter with reference to schematic diagrams, in which:

BRIEF DESCRIPTION OF THE DRAWINGS

Elements with the same function or construction are designated by the same reference numerals throughout the figures.

DESCRIPTION OF THE PREFERRED EMBODIMENTS

Figure 1:
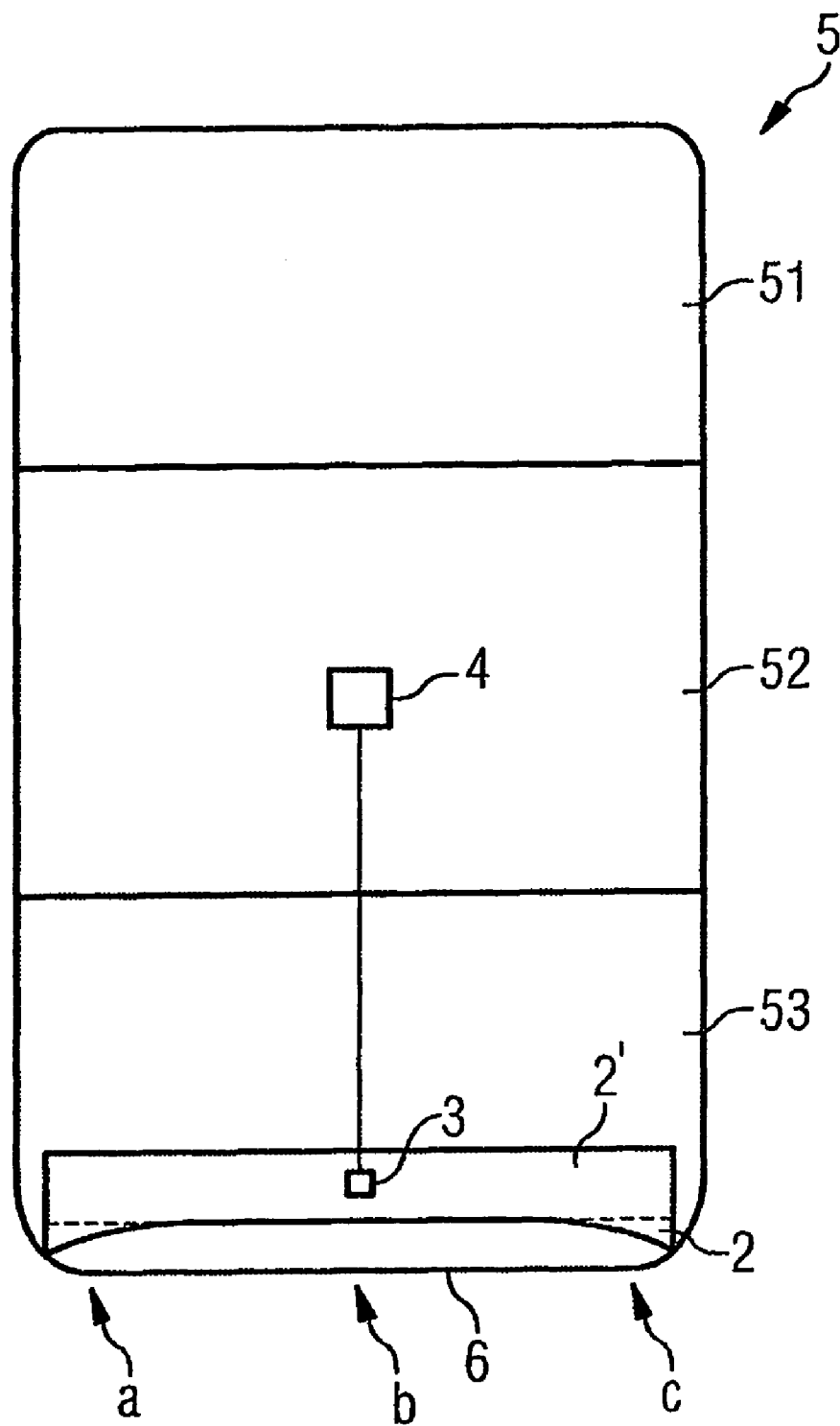
FIG. 1 shows a plan view of a vehicle (5) with a front bumper (6) and a device according to the invention comprising a pressure sensor (3) within a measuring volume (2) according to the invention, shown by a solid line and a measuring volume (2'), shown in broken lines, according to the prior art.

FIG. 1 shows a motor vehicle 5 with a rear section 51 of a passenger compartment 52 and a front section 53. The leading terminal region of the front section 53, facing away from the passenger compartment 52, forms a bumper 6 which in more modern vehicles is usually made of plastics material parts that are easily deformable and which, as a streamlined addition, contribute to the external appearance of the vehicle. The bumper 6 passes from its front boundary surface of the motor vehicle 5 to the sides of the vehicle so as to curve towards its sides. Behind the bumper 6, or as part of the bumper 6, there is arranged a pressure sensor 3 within two schematically illustrated measuring volumes 2, 2', the measuring volume 2' shown in broken lines having a uniform cross-sectional area over its entire length, as is known from the prior art, while the measuring volume 2, shown in a solid line, according to one development of the invention has its largest cross-sectional areas at its two ends, respectively and between them, at the location where the pressure sensor 3 is provided, has a smallest cross-sectional area.

To define three different collision sites with the bumper 6, regions a and c are shown at the left- and right-hand sides of the bumper 6 respectively and centrally therebetween is a collision region c. The pressure sensor 3 is connected to an evaluation unit 4 electrically connected to a central control unit 4 of a passenger protection system.

In the event of a compression of one of the measuring volumes 2 or 2', caused by a collision of an object with one of the collision regions a, b, c, the pressure sensor 3 detects the increase in pressure that results in the process, converts it into a signal and announces it by means of a suitable transmission protocol to the central control unit 4. The central control unit evaluates the received signal and makes triggering of a passenger protection means dependent thereon. The central control unit 4 can however also be a control unit 4 of a pedestrian protection system and bring about triggering of a pedestrian protection means in the event of a corresponding signal, as already described in the introduction.

Figure 2:
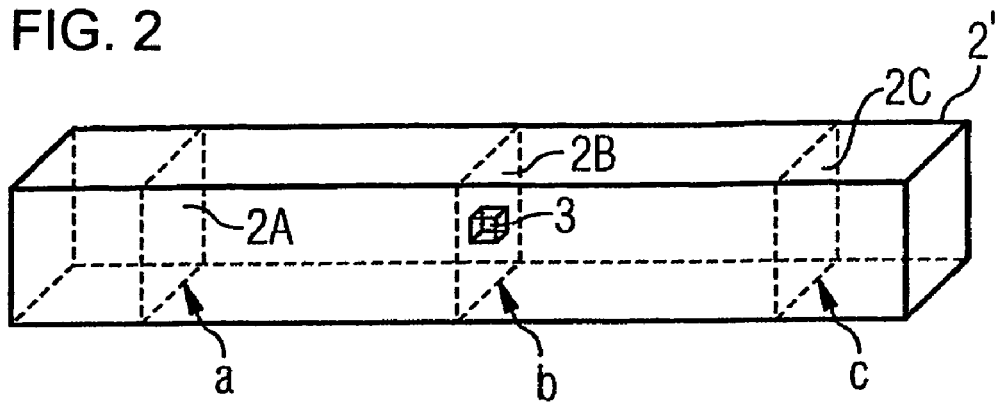
FIGS. 2, 3, 4, 5a, 5b show advantageous embodiments of measuring volumes (2) according to the invention.

FIG. 2 shows the measuring volume 2' according to the prior art, which is shown in FIG. 1 by a solid line, in a schematic perspective view. Associated cross-sectional areas 2A, 2B, 2C, of which the areas are ideally identical in each case, are in each case shown behind the collision regions a, b, c. The pressure sensor 3, provided centrally in the measuring volume 2' in the longitudinal direction, detects the increase in pressure which is generated by a volume compression as a result of an object penetrating the bumper during a collision. Since penetration of the colliding object, for example another vehicle, in the collision regions a and c meets more mechanical resistance, for example as a consequence of the curvature at these locations and the increased rigidity of the bumper 6 caused as a result, the increase in pressure in the measuring volume 2' caused by the object colliding with the collision regions a, c is lower than in the case of a collision with the more easily deformable central collision region b.

Figure 6:
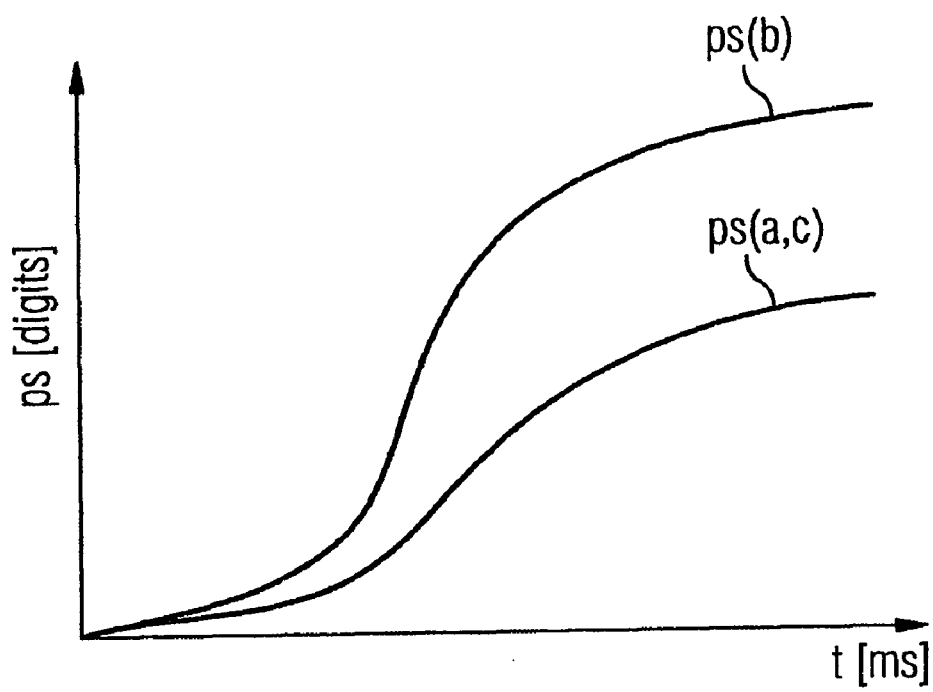
FIG. 6 shows a schematic graph of the signal characteristics (ps) of a pressure sensor (3) for various collision sites (a, b, c) with a measuring volume (2') of the prior art plotted against time (t)

The respective principle characteristic of the signal ps of the pressure sensor 3 for collisions with the three collision regions a, b, c is plotted in FIG. 6 in random units (digits) against time t (ms). A collision with the lateral collision regions a, c generates a signal ps(a, c) which, compared with the signal ps(b) owing to a collision with the central collision region b, increases more slowly and also has lower amplitudes.

Figure 3:
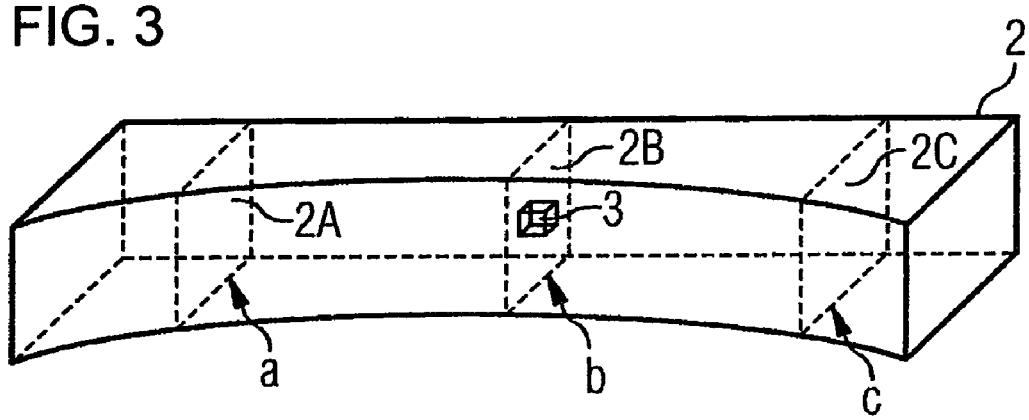

One embodiment of the measuring volume 2 according to the invention, which is shown in FIG. 1 by a solid line, is shown in FIG. 3. The cross-sectional area 2B behind the collision region b is the same size as the measuring volume 2' in FIG. 2. An object colliding herewith ideally generates an increase in pressure of a magnitude that is same as that in the case of the measuring volume 2' in FIG. 2. In contrast to FIG. 2 the cross-sectional areas of the measuring volume 2 in FIG. 3 are larger toward its two lateral ends, however. The cross-sectional areas 2A and 2C for example, located behind the collision regions a and c, are therefore larger than the central cross-sectional area 2B, located therebetween, behind the collision region b. In the collision regions a and c the same colliding object consequently compresses a comparatively larger portion of the total measuring volume 2 than in the case of the measuring volume 2' in FIG. 2. The slower signal increase and the lower signal amplitudes at the pressure sensor 3, which are caused by the mechanical reinforcements in the edge regions a, c of the bumper, are counteracted as a result.

Figure 7:
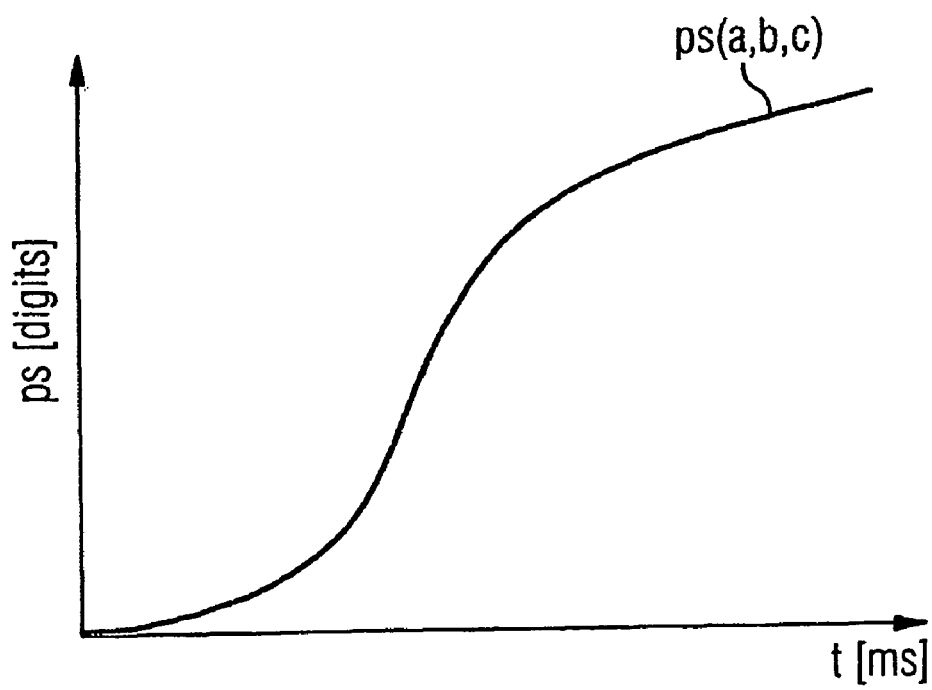
FIG. 7 shows signal characteristics of a pressure signal (ps) for the same collision sites (a, b, c) with a measuring volume (2) according to FIG. 3 likewise plotted against time (t).

Very similar signal characteristics ps of the pressure sensor 3 are consequently measured at the site of the pressure sensor 3 as a result of collisions with the various collision regions a, b, c. These are schematically illustrated in FIG. 7. A collision with the central collision region b generates the same signal characteristic ps(b) as in FIG. 6. However, in the event of collision with collision regions a, c the two signal characteristics ps(a, c) accordingly have a steeper gradient and a higher amplitude in each case and in the ideal case shown here are identical to the signal characteristic ps(b) in the case of a central collision.

Figure 4:
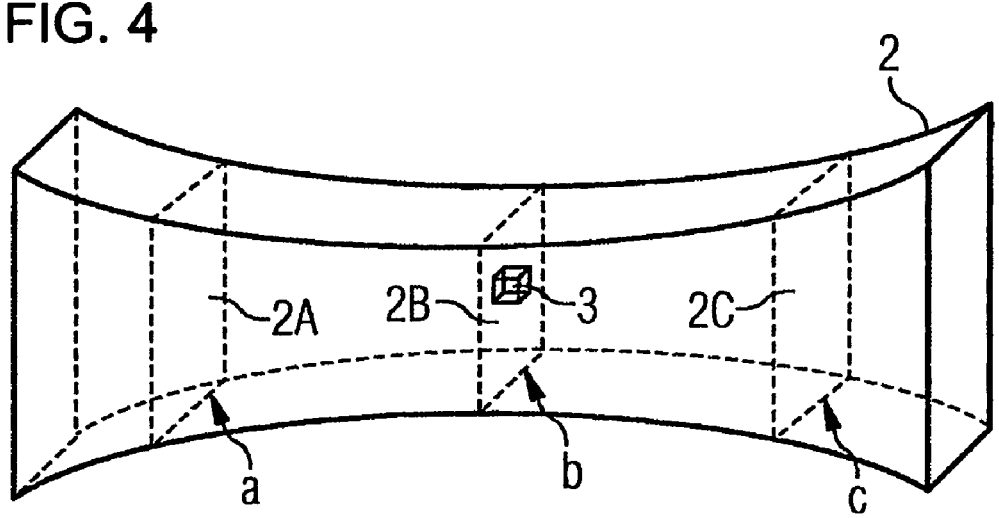

FIG. 4 shows an alternative embodiment of a measuring volume 2 according to the invention in which the cross-sectional area of the measuring volume 2, compared with the central cross-sectional area 2B, also increases in the direction of the two ends of the measuring volume 2. Compared with the cross-sectional increase in the measuring volume 2 in FIG. 3, in which the leading boundary surface of the measuring volume 2 is curved in the direction of the front face of the bumper 6 at the lateral ends, the curvature of the measuring volume 2 shown in FIG. 4, at the two ends of the measuring volume 2, is in the direction of the roof of the vehicle on the one hand and in the direction of the floor of the vehicle on the other hand.

Figure 5A:
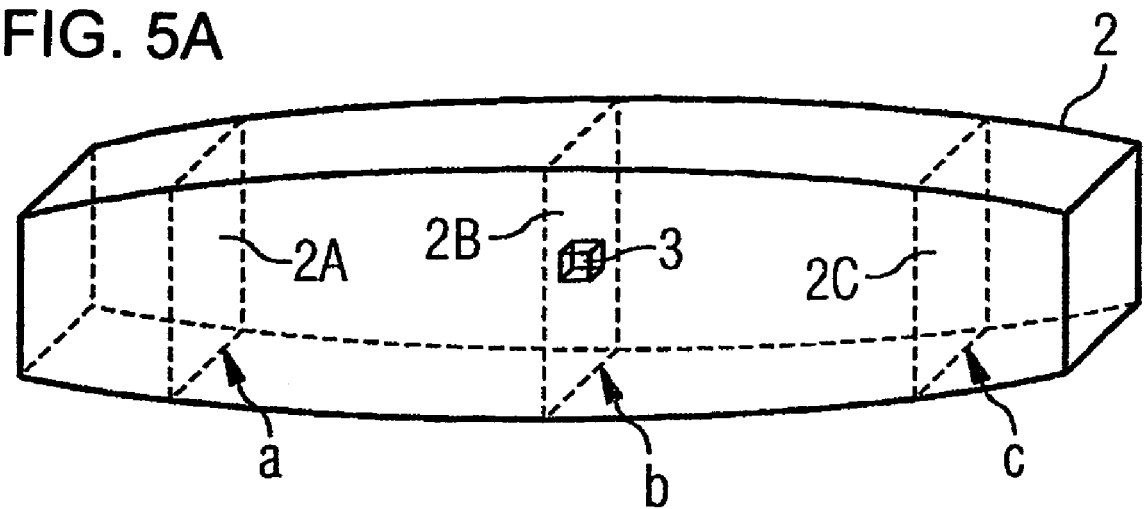

FIG. 5a shows an advantageous development of the invention for an alternative configuration of the front body part 6 of a motor vehicle 5. In this case the measuring volume 2 has its largest cross-sectional area 2B centrally between its two ends, along the bumper 6, and, towards its two ends in each case, a continuously decreasing cross-sectional area, schematically shown by the two lateral cross-sectional areas 2A and 2C. With such a form of the measuring volume 2 a colliding object in the central collision region b can compress a comparatively largest volume and by doing so bring about a comparatively largest increase in pressure. As already mentioned above, this may primarily be advantageous if mechanical reinforcement is found precisely in the region of the front vehicle body 6, for example by way of a support for a number plate, a tow hook or other constructional changes at the leading front of the vehicle 6 which make penetration of a colliding object difficult. A large cross-sectional area on the one hand and a particularly rigid vehicle body part on the other hand at this location in turn counteract each other in the case of a collision with the central collision region b such that firstly the increase in pressure caused thereby and secondly the reduction in pressure ideally cancel each other out.

Figure 5B:
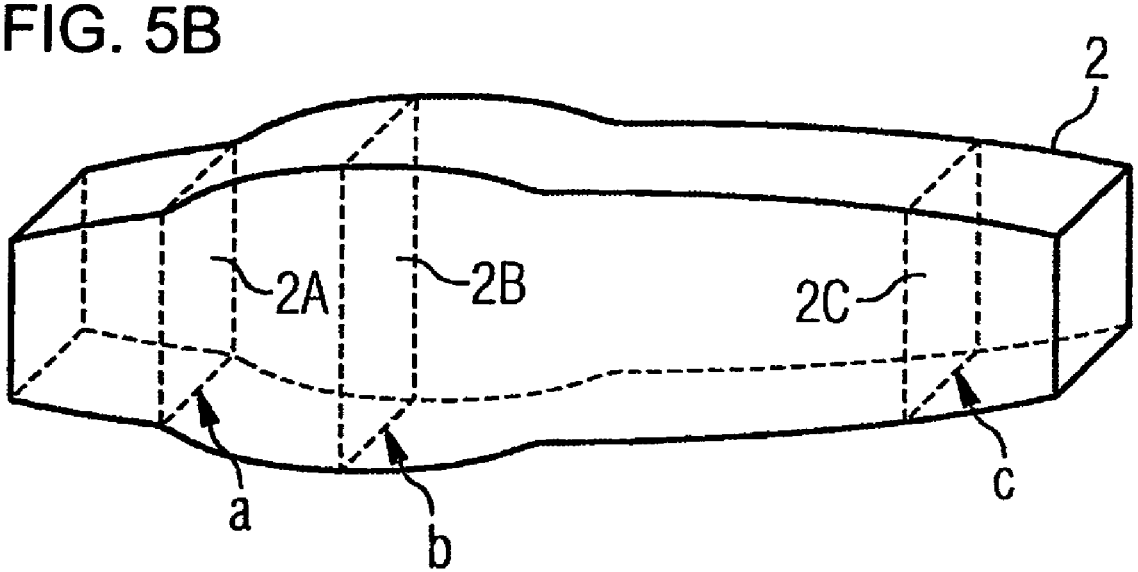

FIG. 5b shows a measuring volume 2 which, compared with FIG. 5a, has the largest cross-sectional area 2B eccentrically between its ends. This embodiment is advantageous in the above context precisely if a signal increase at the pressure sensor 3, reduced by a mechanical reinforcement at this location, for example by a tow hook provided there, is to be counteracted in the event of a collision at this location.

I claim:

1. In combination, a vehicle having a vehicle body with a part potentially affected by a collision, including relatively rigid vehicle body parts that are comparatively difficult to deform during the collision, and a device for detecting a collision, the device comprising:
    a substantially closed measuring volume disposed along the part of the vehicle body potentially affected by the collision, said measuring volume, along a longitudinal direction thereof, having a cross-sectional area with a comparatively larger area in a vicinity of the relatively rigid vehicle body parts that are comparatively difficult to deform during the collision; and
    a pressure sensor disposed for detecting a change in pressure inside said measuring volume in order to detect a compression of said measuring volume upon the collision.

2. The device according to claim 1, wherein the cross-sectional area of said measuring volume, in the longitudinal direction, includes mutually different areas such that, during a collision of a same object at a same speed with different collision sites along the part of the vehicle body affected by the collision, there is a substantially equal signal amplitude at said pressure sensor.

3. The device according to claim 1, wherein said measuring volume has comparatively largest cross-sectional areas at two ends thereof.

4. The device according to claim 1, wherein said measuring volume has a smallest cross-sectional area approximately centrally between the two ends of the measuring volume.

5. The device according to claim 1, wherein said measuring volume has two ends and a largest cross-sectional area approximately centrally between said two ends.

6. The device according to claim 2, wherein said measuring volume has two ends and a largest cross-sectional area approximately centrally between said two ends.

7. The device according to claim 1, wherein said measuring volume has two ends and said pressure sensor is disposed substantially centrally between said two ends.

8. The device according to claim 1, wherein the part of the vehicle body potentially affected by the collision longitudinally extends in a first direction and the measuring volume longitudinally extends in the first direction.

9. The device according to claim 1, wherein the measuring volume includes a central region and two lateral end regions, and the two lateral end regions have the cross-sectional area with the comparatively larger area.

* * * * *